(12) United States Patent
Judas et al.

(10) Patent No.: US 11,104,415 B2
(45) Date of Patent: Aug. 31, 2021

(54) PROPELLER ARRANGEMENT FOR AN AIRCRAFT

(71) Applicant: Airbus Defence and Space GmbH, Taufkirchen (DE)

(72) Inventors: Michael Judas, Munich (DE); Bartholomäus Bichler, Raubling (DE)

(73) Assignee: Airbus Defence and Space GmbH

( * ) Notice: Subject to any disclaimer, the term of this patent is extended or adjusted under 35 U.S.C. 154(b) by 527 days.

(21) Appl. No.: 16/043,534

(22) Filed: Jul. 24, 2018

(65) Prior Publication Data

US 2019/0031318 A1    Jan. 31, 2019

(30) Foreign Application Priority Data

Jul. 28, 2017    (DE) ..................... 10 2017 117 174.6

(51) Int. Cl.
    *B64C 11/34*    (2006.01)
    *B64C 27/43*    (2006.01)
    *B64C 27/57*    (2006.01)
    *B64C 27/59*    (2006.01)
    *B64C 11/06*    (2006.01)
(Continued)

(52) U.S. Cl.
CPC .............. *B64C 11/34* (2013.01); *B64C 11/06* (2013.01); *B64C 27/43* (2013.01); *B64C 27/57* (2013.01); *B64C 27/59* (2013.01); *B64C 29/0025* (2013.01); *B64C 29/0008* (2013.01); *B64C 39/024* (2013.01); *B64C 2027/7211* (2013.01); *B64C 2201/027* (2013.01)

(58) Field of Classification Search
CPC .......... B64C 11/34; B64C 11/06; B64C 27/43; B64C 27/57; B64C 27/59; B64C 29/0025; B64C 29/0008; B64C 2027/7211; B64C 2201/027

See application file for complete search history.

(56) References Cited

U.S. PATENT DOCUMENTS

RE28,045 E    6/1974    Gaffey et al.
4,092,084 A    5/1978    Barltrop
(Continued)

FOREIGN PATENT DOCUMENTS

EP    1 572 534 A1    9/2005
EP    2 279 943 A1    2/2011
(Continued)

*Primary Examiner* — Justin M Benedik
(74) *Attorney, Agent, or Firm* — Lerner, David, Littenberg, Krumholz & Mentlik, LLP

(57) ABSTRACT

A propeller arrangement for an aircraft, and an aircraft having a propeller arrangement of said type, are specified. The propeller arrangement has a first propeller blade and a second propeller blade, and a propeller mount on which both the first propeller blade and the second propeller blade are mounted. The propeller arrangement furthermore has a drive shaft with a holding unit, and a first connecting unit. The first propeller blade is rotatable about a first axis of rotation and the second propeller blade is rotatable about a second axis of rotation. The propeller mount is pivotable about a pivot axis. The first connecting unit is coupled to the first propeller blade and to the holding unit, such that, in the event of a pivoting of the propeller mount about the pivot axis, the first propeller blade is set in rotational motion about the first axis of rotation.

16 Claims, 5 Drawing Sheets

(51) Int. Cl.
*B64C 29/00* (2006.01)
*B64C 39/02* (2006.01)
*B64C 27/72* (2006.01)

(56) References Cited

U.S. PATENT DOCUMENTS

| | | | |
|---|---|---|---|
| 5,853,145 A * | 12/1998 | Carter, Jr. | ............... B64C 27/32 244/17.25 |
| 2004/0056149 A1 | 3/2004 | Pines et al. | |
| 2016/0059960 A1* | 3/2016 | Fearn | ................... B64C 27/022 244/17.11 |
| 2016/0257399 A1* | 9/2016 | Carter, Jr. | ............... B64C 27/59 |

FOREIGN PATENT DOCUMENTS

| | | | |
|---|---|---|---|
| EP | 3 225 543 A1 | 10/2017 | |
| FR | WO2017103867 | * | 6/2017 |
| WO | 2014/160526 A2 | 10/2014 | |
| WO | 2017/103867 A1 | 6/2017 | |

* cited by examiner

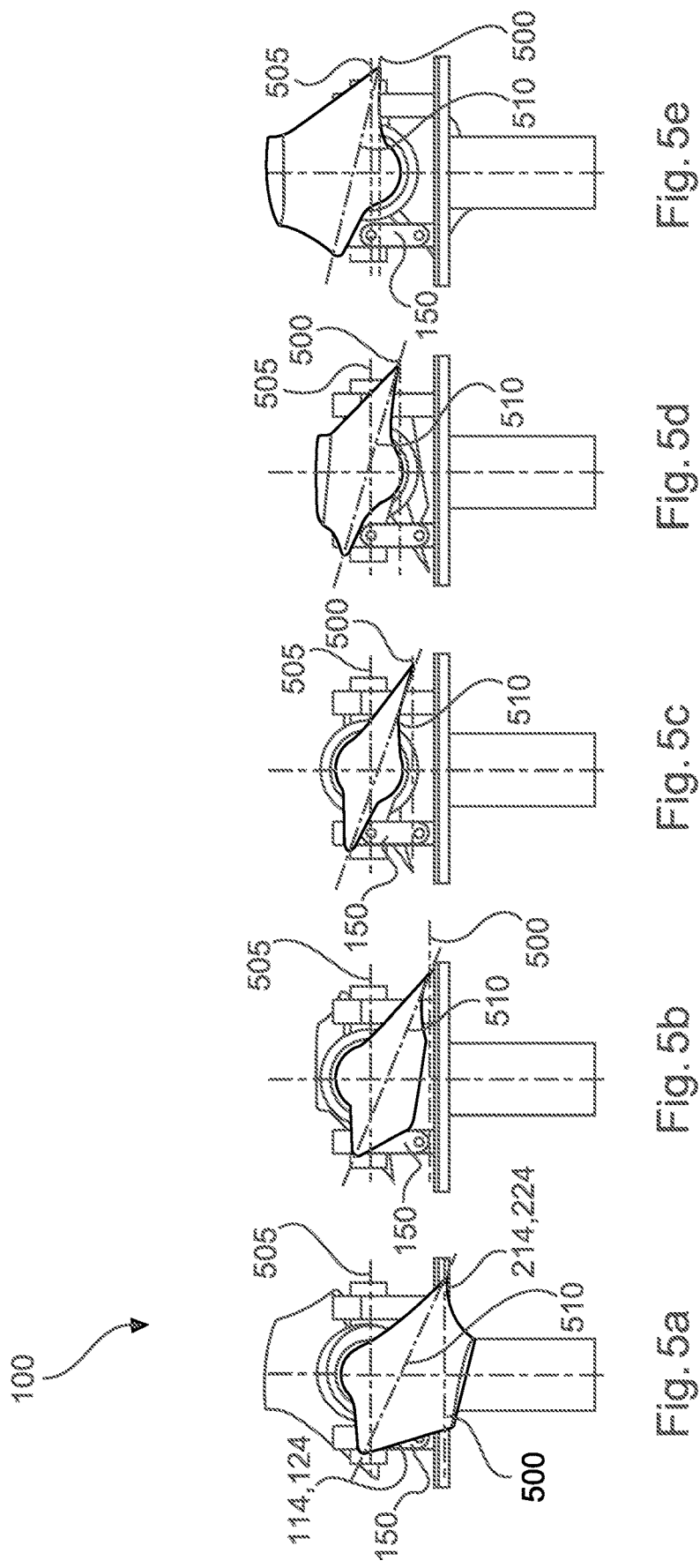

PROPELLER ARRANGEMENT FOR AN AIRCRAFT

FIELD OF THE INVENTION

The invention relates to a propeller arrangement for an aircraft. In particular, the invention relates to a propeller arrangement for an aircraft similar to, for example, a tricopter or quadcopter, and to an aircraft having a propeller arrangement of said type.

BACKGROUND OF THE INVENTION

For many applications, it is desirable to have an aircraft available which can take off from a minimally small area and thus, for example, does not require special large-area airfields. Furthermore, for certain usage situations, an aircraft is required which is agile and can be maneuvered in a precise manner and which can preferably hover on the spot and, here, can exhibit good hovering flight characteristics.

In an alternative application, an aircraft which is capable of vertical take-off, sometimes also referred to as VTOL (Vertical Take-Off and Landing), can be utilized for flying persons or other machines to poorly accessible areas, for example in the context of disaster response missions, for example in order to be able to transport goods such as tools, foodstuffs or medicines into such areas. In general, a VTOL may be used for transport flights or also for reconnaissance and observation purposes.

Inter alia for such usage purposes, aircraft have been developed in the case of which at least three, preferably four or more rotors, which are equipped with a propeller and with a motor that drives said propeller, serve to realize substantially vertically upwardly directed thrust in order to thereby enable the aircraft to lift off vertically and/or hover. An aircraft equipped with four such rotors is also referred to as quadcopter, quadrocopter, quadricopter, quadrotor or hovering platform. In general, such aircraft having more than three rotors for lift purposes are referred to as multicopters, wherein, in addition to quadcopters, variants with three rotors (tricopter), six rotors (hexacopter) or eight rotors (octocopter) are also customary. Such aircraft are normally operated unmanned and can be correspondingly small. Said aircraft are in some cases also referred to as drones. Drones (quadrocopters and multicopters) use propellers with fixed blade setting angles or blade angles of attack to generate thrust for hovering purposes. Here, the thrust is controlled by means of the rotational speed of the electric motors.

With increasing forward speed, the propeller generates more resistance and vibrations. These vibrations must be accommodated by the structure of the aircraft. The vibrations impair the IMU (Inertia Measurement Unit) or gyroscope and give rise to poorer cruising flight comfort with increasing forward speed. Furthermore, alternating bending moments arise, which must be accommodated by the propeller and bearings.

BRIEF SUMMARY OF THE INVENTION

An aspect of the invention may provide a propeller arrangement which both permits good hovering characteristics and reduces the loads and vibrations on the propeller arrangements.

According to a first aspect of the invention, a propeller arrangement for an aircraft is specified, which propeller arrangement has a first propeller blade and a second propeller blade. The propeller arrangement furthermore has a propeller mount on which both the first propeller blade and the second propeller blade are mounted. Furthermore, the propeller arrangement has a drive shaft with a holding unit and has a first connecting unit. The first propeller blade is rotatable about a first axis of rotation. The second propeller blade is rotatable about a second axis of rotation. The propeller mount is pivotable about a pivot axis. The drive shaft is arranged so as to set the propeller mount in rotation. By means of this rotation, the propeller arrangement provides a thrust force, wherein the thrust force can, in the case of VTOL, also be referred to as lift force. The holding unit couples the propeller mount to the drive shaft. The first connecting unit is coupled to the first propeller blade and to the holding unit, such that, in the event of a pivoting of the propeller mount about the pivot axis, the first propeller blade is set in rotational motion about the first axis of rotation.

In one example, the first axis of rotation is arranged along the longitudinal axis of the first propeller blade. The longitudinal axis of the first propeller blade is defined in the direction of the propeller tip as viewed from a propeller root. The propeller root is arranged on or in the propeller mount and is mechanically coupled to the propeller arrangement.

In one example, the axis of rotation and the pivot axis are perpendicular to one another. The pivoting of the propeller arrangement about the pivot axis may also be referred to as tilting or rocking. The pivot axis is preferably arranged centrally between the two propeller blades, wherein the propeller blades can perform a pivoting movement about the pivot axis, specifically in a manner dependent on a lift force acting on the propeller blades, which lift force results inter alia from the rotation of the drive shaft and a relative speed of the aircraft with the propeller arrangement with respect to the air (air movement, movement of the aircraft). The relative speed may comprise in particular a horizontal speed component, that is to say may result from a horizontal movement of the aircraft.

In one example, the first and second axes of rotation coincide. This means that the two propeller blades are situated opposite one another (with the propeller mount in between) such that they have a common axis of rotation.

In one example, the propeller mount is a cardanic mount and permits said pivoting of the propeller mount about the pivot axis and the rotation of the individual propeller blades about the respective axis of rotation.

In one embodiment of the invention, the first connecting unit is coupled to the first propeller blade such that the connecting unit subjects the first propeller blade to a rotational force about the first axis of rotation.

Thus, the first connecting unit can influence or limit a rotation of the first propeller blade about the first axis of rotation. In other words, the first connecting unit is arranged such that it can influence an angle of attack of the first propeller blade.

In a further embodiment of the invention, the first connecting unit is coupled to the first propeller blade at a first leading edge of the first propeller blade.

The first connecting unit is in particular designed to subject the first propeller blade to a force such that the leading edge of the propeller blade is raised or lowered, whereby the angle of attack of the propeller blade varies, which also varies the lift of the propeller blade.

In one example, the leading edge of the propeller blade is the edge pointing in the direction of rotation, that is to say the edge on which the air flow is incident in the flight direction or direction of rotation.

In a further embodiment of the invention, the first connecting unit has a connecting member and a coupling ring coupled to the connecting member. The connecting member is coupled to the holding unit. The coupling ring is coupled to the first propeller blade.

In this embodiment, the first connecting unit is of two-part design and is arranged so as to function as a linking member between the holding unit and the propeller blade. It is pointed out that the connecting unit does not fix the propeller blade relative to the holding unit but is coupled to the holding unit and to the propeller blade in order to be able to influence the movement of the propeller blade about the axis of rotation. The transmission of the lift force originating from the propeller blade to the aircraft takes place, as before, via the propeller mount. The connecting element may be designed as a shaft or bar or rod.

In one example, the connecting member is coupled materially integrally (for example by welding) to the holding unit. Alternatively, the connecting member may be coupled to the holding unit by other mechanisms.

In one example, the coupling ring is coupled in positively locking, non-positively locking or materially integral fashion (for example welding, adhesive bonding) to the propeller blade. In another example, the coupling ring is frictionally coupled to the propeller blade. For example, the coupling ring is placed around a root of the propeller blade, such that a force can be transmitted by the connecting member and the coupling ring to the propeller blade.

In a further embodiment of the invention, the connecting member is coupled by means of a first articulated connection to the coupling ring. The connecting member is coupled by means of a second articulated connection to the holding unit.

This makes it possible for the connecting member to be able to perform a pivoting movement relative to the holding unit. This pivoting movement is in particular a rotational movement with one degree of freedom, that is to say about an axis of rotation of the second articulated connection. Likewise, the first articulated connection makes it possible for the connecting member to move relative to the coupling ring, specifically as part of a rotational movement about an axis of rotation of the first articulated connection. The second articulated connection is preferably movable and non-rigid. The second articulated connection may be a ball joint.

In a further embodiment of the invention, the first connecting unit is designed to subject the first propeller blade to a pulling force in order to rotate the first propeller blade about the first axis of rotation.

This pulling force may for example result from the propeller arrangement performing a pivoting movement about the pivot axis of the propeller mount. In the case of this pivoting movement, one propeller blade moves towards the holding unit and the opposite propeller blade moves away from the holding unit. In a manner dependent on the specific direction of the pivoting movement, the first connecting unit subjects the leading edge of the first propeller blade to a force such that the first propeller blade assumes a corresponding angle of attack. In particular, the angle of attack of the first propeller blade is reduced by virtue of the leading edge of the first propeller blade being pulled downwards, which likewise reduces the lift force on the first propeller blade. In the situation in which the first propeller blade moves away from the holding unit, the first connecting unit subjects the first propeller blade, or the leading edge thereof, to a pulling force.

In one example, the pulling force acts in the opposite direction to the lift, that is to say the leading edge is pulled downwards by means of the pulling force if the corresponding propeller blade pivots upwards (away from the holding unit).

In a further embodiment of the invention, the first connecting unit is designed to subject the first propeller blade to a pushing force in order to rotate the first propeller blade about the first axis of rotation.

This is the reversal of the situation described above. If the first propeller blade moves towards the holding unit owing to the pivoting movement of the propeller arrangement, the first connecting unit thus counteracts this pivoting movement and pushes the leading edge of the first propeller blade upwards, in order to increase an angle of attack, which in turn increases the lift force on the first propeller blade.

In one example, the pushing force acts in the opposite direction to the pivoting movement of the propeller arrangement, that is to say the leading edge is pushed upwards by means of the pushing force.

In a further embodiment of the invention, the first connecting unit is manufactured from a metallic material or has a metallic material.

In this way, the first connecting unit has material characteristics for subjecting the first propeller blade to the required forces. The first connecting unit is elastically substantially non-deformable under the forces occurring in a propeller arrangement during flight operation of an aircraft, such that the function, described herein, of subjecting the leading edge of a propeller blade to pulling forces and pushing forces can be realized. The first connecting unit may in this case be formed such that it can withstand the occurring forces in a manner dependent on the propeller arrangement (for example dimensions of the propeller blades) and other specifications of the aircraft (for example weight, flight speed, rotational speed of the propeller arrangement), without being plastically or elastically substantially deformed in the process. In one example, the connecting unit may be manufactured from carbon fibre or plastic, or may have such materials.

According to a further embodiment of the invention, the holding unit has two holding arms. The holding arms are arranged so as to hold the propeller mount in an intermediate space between the holding arms and to permit a pivoting about the pivot axis.

In one example, the propeller mount is cardanically mounted on the two holding arms by means of a bolt.

The pivoting movement of the propeller arrangement or of the propeller mount with the two propeller blades takes place about an axis of rotation of the bolt. The holding unit connects the propeller blades to a drive shaft and thus ensures that a rotation of the drive shaft is transmitted to the propeller blades. The holding unit is not affected by the pivoting movement of the propeller mount together with propeller blades. This means that the propeller mount moves relative to the holding unit, specifically performs a rotational movement about the pivot axis, during the pivoting movement. This pivoting movement may take place in particular during flight operation of the aircraft, specifically when the aircraft transitions from vertical flight to horizontal flight, or during sideslip flight, which involves at least one horizontal component or horizontal movement relative to the surrounding air. In this case, the propeller mount or the two propeller blades perform the above-described pivoting movement about the pivot axis in a manner dependent on the speed with which the air is incident on a propeller blade or with which a propeller blade moves relative to the air. In general, the forward-moving propeller blade (the propeller blade moving in the direction of the horizontal movement) has a higher speed in relation to the surrounding air, because the rotational speed and the movement of the aircraft are superposed in the same direction, whereas, in the case of the backward-moving propeller blade (the propeller blade moving oppositely to the horizontal movement), the rotational speed and the horizontal movement of the aircraft are partially cancelled out or directed oppositely. This has the effect that the lift is greater in the case of the forward-moving propeller blade than in the case of the backward-moving propeller blade, which can lead to the above-described loading and vibration. The first connecting unit ensures that, in the case of the pivoting movement of the propeller arrangement, in a manner dependent on the direction of the pivoting movement, the leading edge of the propeller blade is either pushed upwards or pulled downwards in order to compensate the periodically alternating lift force in the presence of a horizontal movement component of the aircraft (in particular of a VTOL).

In a further embodiment of the invention, the propeller arrangement has a second connecting unit. The second connecting unit is coupled to the second propeller blade and to the holding unit, such that, in the event of a pivoting of the propeller mount about the pivot axis, the second propeller blade is set in rotational motion about the second axis of rotation.

The second connecting unit acts on the second propeller blade in a similar manner to that in which the first connecting unit acts on the first propeller blade. In this respect, reference is made to the statements above relating to the functional and structural linking of the first connecting unit to the first propeller blade, which apply analogously to the functional and structural linking of the second connecting unit to the second propeller blade.

In a further embodiment of the invention, the second connecting unit is coupled to the second propeller blade at a second leading edge of the second propeller blade.

Thus, both the first connecting unit and the second connecting unit are coupled to the leading edge of the respective propeller blade, such that the connecting units act on that edge of the propeller blade on which the air is incident during a rotation of the propeller and/or during forward flight of the aircraft, and push said edge upwards or pull said edge downwards. Since the two propeller blades are arranged opposite one another and the pivot axis is situated therebetween, it is the case during every pivoting movement about the pivot axis that one propeller blade is subjected to a pulling force and the other propeller blade is subjected to a pushing force, such that the angle of attack of one propeller blade becomes greater and the angle of attack of the other propeller blade becomes correspondingly smaller.

In a further embodiment of the invention, the second connecting unit is coupled to the second propeller blade and the first connecting unit is coupled to the first propeller blade such that, during the pivoting of the propeller mount about the pivot axis, the first connecting unit subjects the first propeller blade to a pushing force, and at the same moment the second connecting unit subjects the second propeller blade to a pulling force.

The second connecting unit is of analogous construction to the first connecting unit. Reference is made to the statements relating thereto, in particular also relating to the interaction between second connecting unit and second propeller blade, which corresponds to the interaction between the first connecting unit and the first propeller blade.

With increasing forward speed, more lift is generated at the forward-moving propeller blade than at the backward-moving propeller blade. By means of the propeller mount according to the invention, the first and second propeller blades can pivot about the pivot axis, wherein, during this pivoting movement, the angle of attack of the propeller blades is influenced by the first and/or second connecting unit in order to influence a lift at the respective propeller blade. In this way, the magnitude of the cyclic change of the lift on the propeller blades is reduced (during forward flight of the aircraft, during one full rotation of the propeller arrangement, firstly the first propeller blade is the forward-moving propeller blade and the second propeller blade is the forward-moving propeller blade, such that, during each full rotation of the propeller arrangement, the lift alternates at least once from one propeller blade to the other propeller blade), and bending moments and vibrations at the propeller mount are likewise reduced. In the example, the forward-moving propeller blade or the second propeller blade moves upwards, because it generates more lift owing to the additional incident flow (sum of the rotational speed of the propeller and the flight speed of the aircraft in the horizontal direction). The connecting unit exerts a pulling force on the upwardly pivoting forward-moving propeller blade, such that the connecting unit subjects the upwardly pivoting propeller blade to a rotational force about the first axis of rotation, and pulls the leading edge of said propeller blade downwards, which reduces the angle of attack and likewise reduces the lift. Through the arrangement of the connecting unit at the leading edge of the propeller blade, an angle of attack of the upwardly pivoting propeller blade is reduced, in a manner which is desired for this example.

The angle of attack may also be referred to as setting angle, and refers to the position of the propeller blade relative to the flight direction or direction of rotation of the propeller arrangement or to a horizontal plane parallel to the Earth's surface.

On the other side, the connecting unit subjects the downwardly pivoting, backward-moving propeller blade, or first propeller blade, to a pushing force, such that the connecting unit subjects the first propeller blade to a rotational force about the first axis of rotation and pushes the leading edge of the backward-moving propeller blade upwards. The setting angle of the first propeller blade is increased, in a manner which is desired for this example. It is thus made possible for the lift nonequilibrium between the first and the second propeller blade, and thus the loads on the propeller arrangement, to be reduced.

According to a further aspect of the invention, an aircraft is specified on which at least one propeller arrangement is arranged in order to provide a lift force.

In one example, the aircraft is a multicopter or tricopter or quadrocopter or quadcopter and is capable of taking off vertically. Here, the propeller arrangements or the at least one propeller arrangement provide the lift force.

In a further embodiment of the invention, the aircraft has a thrust drive and at least one aerofoil.

In one example, the thrust drive is a propeller. Fast forward flight is made possible by means of the thrust drive and the aerofoils. The propeller arrangements serve for take-off or landing of the aircraft in a vertical direction with respect to the Earth's surface. The aerofoil may be one continuous aerofoil. The aircraft may however also have multiple aerofoils which are arranged laterally on a fuselage.

During the transition from vertical movement of the aircraft into forward flight, the propeller arrangements are subjected to the greatest loads owing to the lift nonequilibrium at the forward-moving (second propeller blade) and backward-moving propeller blade (first propeller blade).

Through the variation of the setting angle by means of the first and second connecting units at the first and second propeller blades, the lift nonequilibrium and the loads on the propeller arrangements are reduced.

The propeller arrangement preferably has exactly two propeller blades. This has the advantage that, during forward flight or horizontal flight, the propeller arrangement can be fixed such that the two propeller blades are oriented in the flight direction (the axis of rotation of the propeller blades points in the flight direction) in order to generate the lowest possible resistance in order to permit more efficient flight operation. During forward flight, the required lift for the aircraft is provided by the aerofoils.

BRIEF DESCRIPTION OF THE DRAWINGS

Exemplary embodiments of the invention will be described below with reference to the figures, in which:

FIGS. 5a-5e show further side views of the propeller arrangement as per a further exemplary embodiment of the invention.

DETAILED DESCRIPTION

The illustrations in the figures are schematic and are not true to scale.

Where the same reference designations are used in the following figure description, these thus relate to identical or similar elements.

Figure 1:
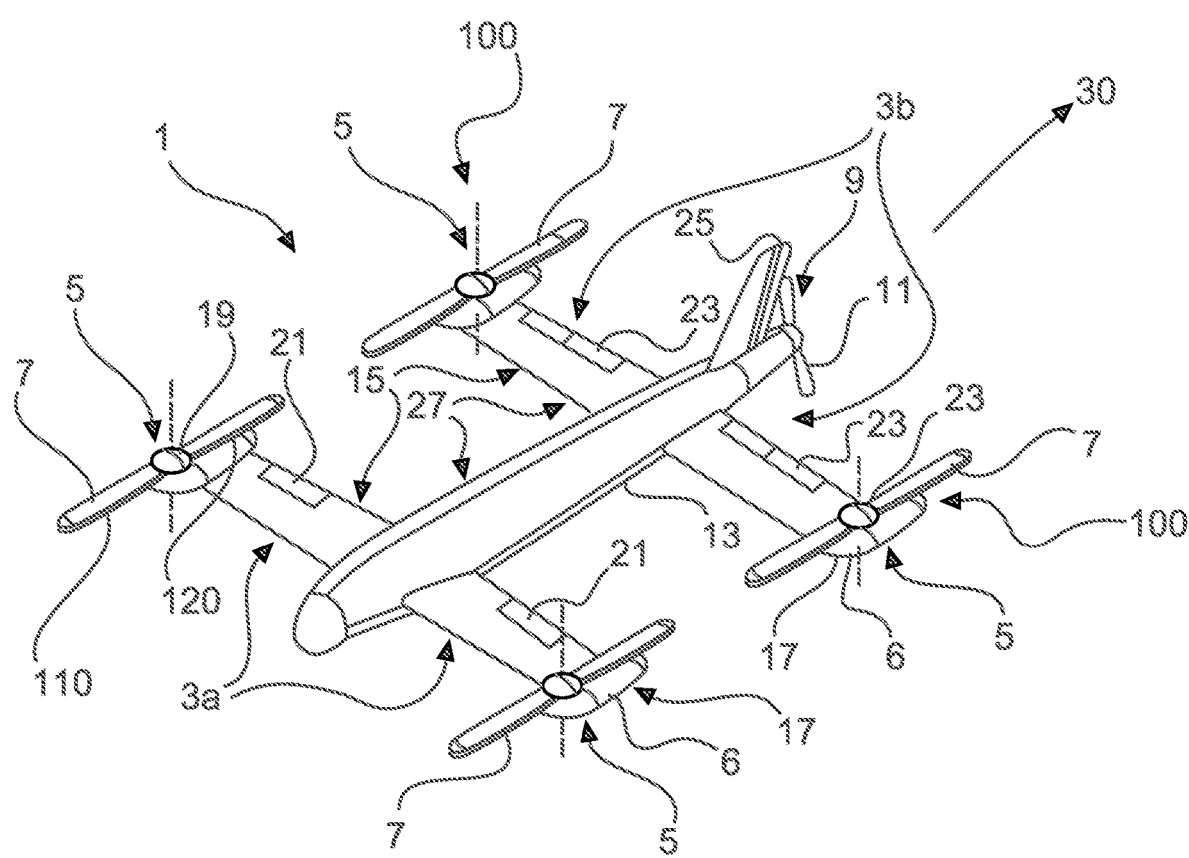
FIG. 1 shows a perspective view of an aircraft, in particular of a quadcopter, as per an exemplary embodiment of the invention.

FIG. 1 shows an aircraft 1 having at least one propeller arrangement 100 (there are four propeller arrangements 100 in the example of FIG. 1) on the aircraft for the purposes of providing a lift force.

In the embodiment illustrated, the aircraft 1 has a tandem wing structure, wherein, similarly to a quadcopter, one of four lift rotors 5 equipped with a propeller 7 is arranged at each end of one of the aerofoils 3a, 3b. The lift rotors are arranged on nacelles 6 at the ends of the aerofoils 3a, 3b.

The aircraft 1 has a support structure 27 and a wing structure 15. The support structure 27 provides the aircraft 1 with the required mechanical strength, for example for the purposes of transmitting forces generated by the lift rotors 5 or by the aerofoils 3a, 3b between individual regions of the aircraft 1. The support structure 27 has, for this purpose, for example struts, stringers and ribs, by means of which, inter alia, an elongate fuselage 13 and load-bearing parts of the aerofoils 3a, 3b can be formed.

In the example illustrated in FIG. 1, the support structure 27 is formed together with the wing structure 15 as a tandem wing structure, in the case of which an elongate fuselage 13 is equipped with two pairs of aerofoils 3a, 3b which are arranged one behind the other in a horizontal direction and which project transversely, approximately at right angles, laterally from the fuselage 13.

The aerofoils 3a, 3b of the wing structure 15 are in this case formed, and attached at suitable positions to the fuselage 13, such that a neutral point of the wing structure 15 is positioned relative to a center of gravity of the aircraft 1 in a manner suitable for horizontal flight of the aircraft 1. A neutral point of an aerofoil profile or of a wing structure with multiple aerofoil profiles can in this case be understood to mean a fixed point with a constant torque in the range of moderate angles of attack.

The wing structure 15 forms inter alia the multiple aerofoils 3a, 3b of the aircraft. Each of the aerofoils 3a, 3b of the wing structure 15 has in this case a suitable profile for generating a lift force on the aircraft 1 by means of dynamic lift during a horizontal movement of the aircraft 1.

Both on the aerofoils 3a of a front aerofoil pair and on the aerofoils 3b of a rear aerofoil pair, it is furthermore possible for control surfaces 21, 23 in the form of flaps or rudders to be provided, which, similarly to the case of a conventional aircraft at high cruising flight speeds in a horizontal direction, can serve as elevator or horizontal tail. Furthermore, a vertical tail or side rudder 25 may be provided at the rear of the fuselage 13.

At ends or end regions of each of the aerofoils 3a, 3b, in each case one lift rotor 5 is provided on a nacelle 6, such that the total of four lift rotors 5 are arranged in a common plane and at the four corners of a virtual tetragon.

Each of the lift rotors 5 has a propeller arrangement 100 which can be driven in rotation by means of a rotor axle 19 and a motor. Each propeller arrangement 100 has a first and a second propeller blade 110, 120.

Figure 3A:
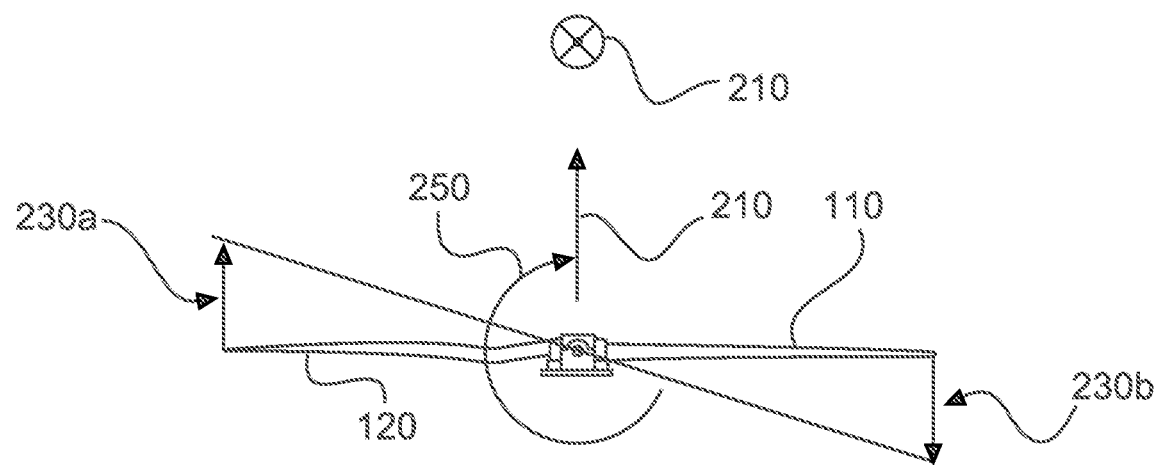
FIG. 3a shows a side view of a propeller arrangement according to a further exemplary embodiment of the invention.

Each of the lift rotors 5 is designed to generate a lift force 210 (see FIG. 3a). Here, the lift rotors 5 should be positioned on the aircraft 1, and oriented, such that a sum of the lift forces generated by them runs approximately through a center of gravity of the aircraft 1, in particular in the event of simultaneous uniform actuation of all lift rotors 5. The total lift that can be generated by the lift rotors 5 should in this case suffice to enable the aircraft 1 to be raised and to hover.

To achieve high cruising flight speeds, the aircraft 1 additionally has a thrust drive 9, with the aid of which a thrust force 30 acting in a horizontal direction (see FIG. 1) can be generated, and two aerofoils 3a, 3b.

Figure 2:
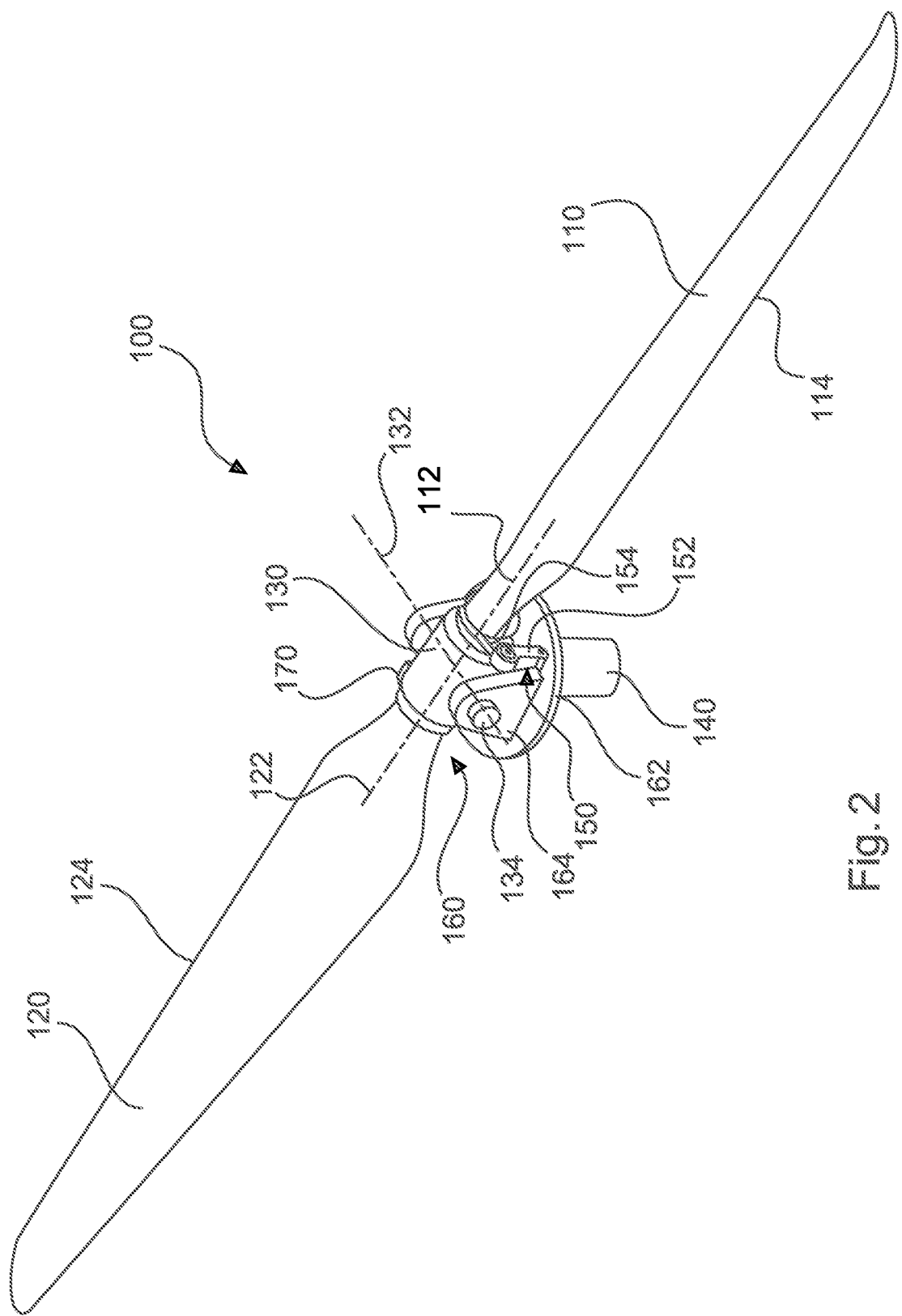
FIG. 2 shows a perspective view of the propeller arrangement as per a further exemplary embodiment of the invention.

FIG. 2 shows a perspective view of the propeller arrangement 100 as per an exemplary embodiment of the invention for one of the four lift rotors 5 as shown in FIG. 1.

The propeller arrangement 100 for an aircraft has a first propeller blade 110 and a second propeller blade 120. Also illustrated is a propeller mount 130 on which both the first propeller blade 110 and the second propeller blade 120 are mounted. Furthermore, the propeller arrangement 100 has a drive shaft 140 with a holding unit 160 and has a first connecting unit 150. The drive shaft 140 is coupled or couplable to the motor of the lift rotor. The first propeller blade 110 is rotatable about a first axis of rotation 112, and the second propeller blade 120 is rotatable about a second axis of rotation 122.

The propeller mount 130 is pivotable about a pivot axis 132. The drive shaft 140 is arranged so as to set the propeller mount 130 in rotation. The holding unit 160 couples the propeller mount 130 to the drive shaft 140, such that a rotation of the drive shaft 140 can be transmitted to the propeller mount 130 and the propeller blades 110, 120. The first connecting unit 150 is coupled to the first propeller blade 110 and to the holding unit 160, such that, in the event of a pivoting of the propeller mount 130 about the pivot axis 132, the first propeller blade 110 is set in rotational motion about the first axis of rotation 112. If the first propeller blade 110 pivots downwards, its leading edge 114 is thus pushed upwards, and vice versa.

An angle between the axes of rotation 112, 122, on the one hand, and the pivot axis 132 may be 90°. This angle may, as viewed in a direction of rotation of the propeller, lie between 45° and 90°. In the plane of rotation, said angle is the opening angle between the axes of rotation 112, 122 and the pivot axis 132.

The axes of rotation 112, 122 preferably lie in the same plane, that is to say have no vertical offset in the direction of the lift force. The axes of rotation 112, 122 may furthermore lie in the same plane as the pivot axis 132 if the axes of rotation are not pivoted, that is to say extend horizontally. Alternatively, the axes of rotation 112, 122 may be vertically offset in relation to the pivot axis 132.

In one example, the propeller blades 110, 120 and the propeller mount 130 may be formed in one piece. The rotational movement of the propeller blades about the axes of rotation 112, 122 may be realized by means of material characteristics, for example by means of the elasticity of the propeller blades, wherein said elasticity must exist at least in a region of the propeller blade root. In this example, the propeller mount 130 and the holding unit 150 may additionally be formed in one piece, wherein the pivoting movement about the pivot axis 132 is likewise made possible by means of material characteristics, in particular by means of the elasticity of the propeller mount 130 and/or of the holding unit 150.

In one embodiment, the first connecting unit 150 is coupled to the first propeller blade 110 such that the connecting unit 150 subjects the first propeller blade 110 to a rotational force about the first axis of rotation 112.

In one embodiment, the first connecting unit 150 is coupled to the first propeller blade 110 at a first leading edge 114 of the first propeller blade 110.

Furthermore, in one example, the first connecting unit 150 has a connecting member 152 and a coupling ring 154 coupled to the connecting member 152. The connecting member 152 is coupled to the holding unit 160. The coupling ring 154 is coupled to the first propeller blade 110.

In one example, the connecting member 152 is coupled by means of a first articulated connection to the coupling ring 154. In one example, the connecting member 152 is coupled by means of a second articulated connection to the holding unit 160.

In one example, the first connecting unit 150 is designed to subject the first propeller blade 110 to a pulling force (see FIG. 4a) in order to rotate the first propeller blade 110 about the first axis of rotation 112.

In one example, the first connecting unit 150 is designed to subject the first propeller blade 110 to a pushing force in order to rotate the first propeller blade 110 about the first axis of rotation 112.

As can be seen from FIG. 2, in the event of a pivoting movement of the propeller arrangement about the pivot axis 132, one propeller blade is moved in the direction of the holding unit and the other propeller blade is moved away from the holding unit. By means of this pivoting movement, it is always the case that the angle of attack of one propeller blade is increased and the angle of attack of the other propeller blade is reduced, whereby it is always the case that the propeller blade that pivots downwards (in the direction of the holding unit) assumes a greater angle of attack than the other propeller blade, such that the lift on the downwardly pivoting propeller blade is increased.

Typically, each propeller blade is subjected to an individual lift force. A nonequilibrium between the lift forces on the two propeller blades has the effect that the propeller arrangement pivots about the pivot axis 132. To compensate for this nonequilibrium between the lift forces, the connecting unit is provided and effects the compensation between the lift forces on the two propeller blades by virtue of the leading edge of the propeller blades being pushed upwards or pulled downwards in a manner dependent on the pivoting movement about the pivot axis 132.

The angle of attack denotes the angle between the direction of rotation or plane of rotation and a connecting line between leading edge and trailing edge of a propeller blade. In other words, the angle of attack indicates the steepness of a propeller blade.

In one example, the first connecting unit 150 is manufactured from a metallic material.

In one example, the holding unit 160 has two holding arms 164, wherein the holding arms 164 are arranged so as to hold the propeller mount in an intermediate space between the holding arms and to permit a pivoting about the pivot axis 132.

In one example, the holding unit has two holding arms 164 and a plate 162 for connecting the propeller mount 130 to the drive shaft 140 or coupling these to one another; the holding unit may be formed integrally with the drive shaft.

In one example, the propeller arrangement has a second connecting unit 170. The second connecting unit 170 is coupled to the second propeller blade 120 and to the holding unit 160 such that, in the event of a pivoting of the propeller mount 130 about the pivot axis 132, the second propeller blade 120 is set in rotational motion about the second axis of rotation 122.

In one example, the second connecting unit 170 is coupled to the second propeller blade 120 at a second leading edge 124 of the second propeller blade 120.

In one example, the second connecting unit 170 is coupled to the second propeller blade 120 and the first connecting unit 150 is coupled to the first propeller blade 110 such that, during the pivoting of the propeller mount 130 about the pivot axis 132, the first connecting unit 150 subjects the first propeller blade 110 to a pushing force, and at the same moment the second connecting unit 170 subjects the second propeller blade 120 to a pulling force.

Figure 3B:
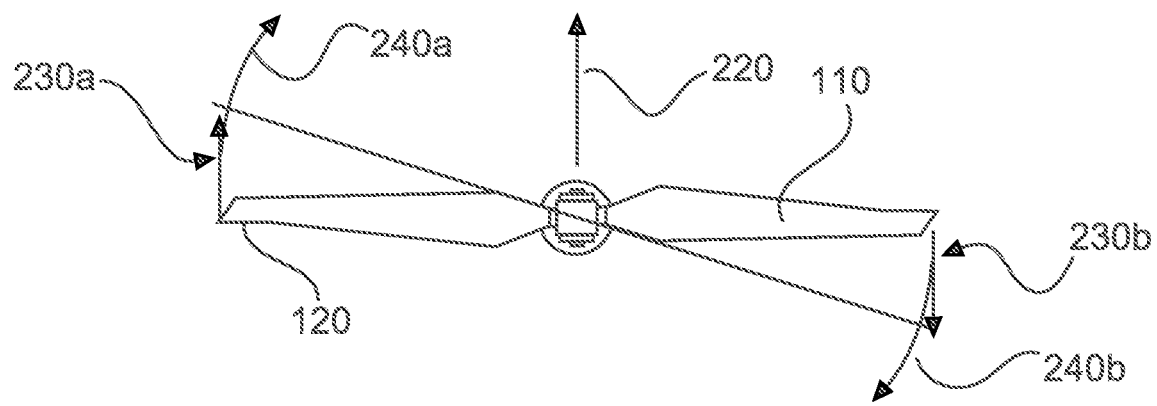
FIG. 3b shows a plan view of the propeller arrangement according to a further exemplary embodiment of the invention.

FIG. 3a and FIG. 3b show a movement pattern of the propeller arrangement in one phase of flight, for example the transition of the movement of the aircraft from hovering flight or vertical flight into forward flight. The propeller arrangements 110 enable the aircraft to take off vertically upwards, as described above. The thrust drive 9 imparts the thrust force for forward flight. The direction of forward flight is illustrated by the arrow 220, wherein the arrow 220 points into the plane of the drawing.

In one example, with increasing forward speed, a nonequilibrium lift distribution arises at the first propeller blade and the second propeller blade, wherein, in the example illustrated, the second propeller blade 120 is the forward-moving propeller blade and the first propeller blade 110 is the backward-moving propeller blade.

In one example, the second propeller blade 120 is the forward-moving propeller blade, that is to say the direction of rotation 240a of the second propeller blade rotates in the forward direction (see FIG. 3b), and the first propeller blade 110 is a backward-moving propeller blade, that is to say the first propeller blade rotates in the opposite direction 240b in relation to forward flight.

With increasing forward speed, greater lift 230a is generated on the forward-moving propeller blade 120 than on the backward-moving propeller blade 110. In the example, the forward-moving propeller blade or the second propeller blade moves upwards because, owing to the additional incident flow, it is subjected to greater lift 230a. By contrast, the backward-moving propeller blade 110 is subjected to a lesser incident flow, such that the lift 230b of the first propeller blade 110 is reduced. By means of the propeller mount according to the invention, the first and second propeller blades 110, 120 can pivot (see arrow 250), and the connecting units assigned to the respective propeller blade act on the leading edges in order to influence an angle of attack of the propeller blades. In the example of FIGS. 3a and 3b, the leading edge of the backward-moving propeller blade 110 is pushed upwards (the angle of attack is increased, which leads to an increased lift force), and the leading edge of the forward-moving propeller blade 120 is pulled downwards (the angle of attack is reduced, which leads to a reduced lift force). In this way, the extent of the pivoting movement is reduced.

Figure 4:
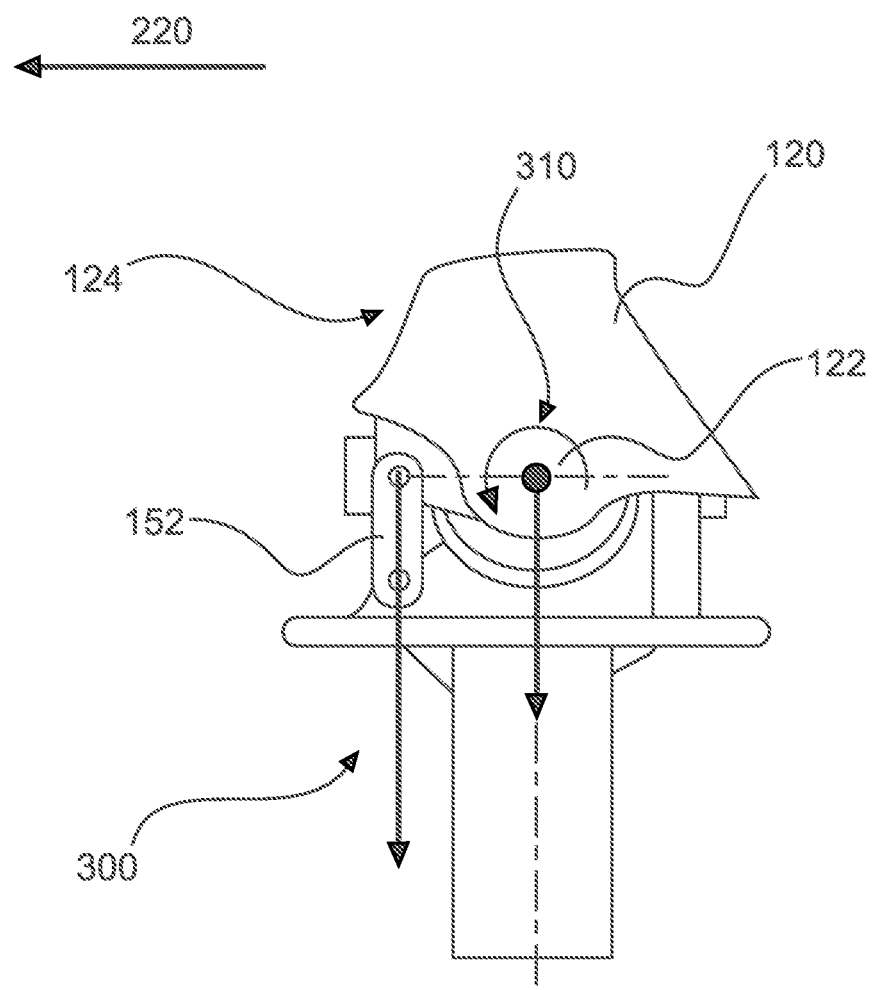
FIG. 4 shows a further side view of the propeller arrangement as per a further exemplary embodiment of the invention.

FIG. 4 shows the connecting member 152 which subjects the upwardly pivoting second propeller blade 120 (forward-moving propeller blade, see FIG. 3a) to a pulling force (see arrow 300), such that the connecting member 152 subjects the forward-moving propeller blade 120 to a rotational force 310 about the second axis of rotation 122. By means of the arrangement of the connecting member 152 (and of the connecting unit as a whole) at the leading edge 124 of the propeller blade, the second propeller blade is rotated such that a setting angle of the second propeller blade becomes smaller if the second propeller blade pivots upwards. The reduction of the setting angle causes the lift on the second propeller blade to be reduced.

The connecting unit 150 acts analogously on the downwardly pivoting backward-moving propeller blade or first propeller blade 110, but in the reverse direction. If the second propeller blade pivots upwards, this has the effect that the first propeller blade forcibly pivots downwards. A pushing force is applied, such that the connecting unit 150 subjects the first propeller blade 110 to a rotational force 310 about the first axis of rotation 112. The setting angle of the first propeller blade 110 is increased in order to increase the lift of the backward-moving propeller blade.

By means of the propeller arrangement according to the invention, it is made possible for the lift nonequilibrium of the first and second propeller blades and thus the loads on the propeller arrangements to be reduced. By means of the pivoting about the pivot axis, it is always case that the setting angle of one propeller blade is increased, whereas the setting angle of the opposite propeller blade is reduced.

FIGS. 5a-5e show the variation of the angle of attack or setting angle of the first or second propeller blade 110, 120 in a manner dependent on the pivoting movement of the propeller arrangement about the pivot axis. The angle of attack is shown by the arrangement of the connecting line 510. Basically, the angle of attack is specified in relation to a plane of rotation of the propeller arrangement. The connecting line 510 may be regarded as a connection between a point of the leading edge 114, 124 and a point of the trailing edge 214, 224 of the propeller blade, and thus indicates the inclination of the propeller blade, wherein said inclination corresponds to the angle of attack.

FIGS. 5a to 5e show different pivot angle positions of the propeller arrangement 100, wherein the propeller blades are arranged such that one propeller blade points out of the plane of the drawing, towards the viewer, and the other propeller blade points into the plane of the drawing, away from the viewer. For the purposes of simpler reference, the propeller blade pointing out is referred to in this context as the front propeller blade and the other propeller blade is referred to as the rear propeller blade, wherein these directional specifications in this context have nothing to do with the flight direction of the aircraft. In FIG. 5a, the front propeller blade is pivoted almost fully downwards, and thus corresponds to a scenario with lower lift in relation to the other propeller blade. This relationship of the lift forces on the propeller blades results from the other propeller blade having been pivoted upwards, which can only be the result of the more intense lift force on the other propeller blade. By contrast, FIG. 5e shows the reverse situation in which the front propeller blade is pivoted upwards and corresponds to a scenario with relatively high lift in relation to the rear propeller blade. FIGS. 5b, 5c and 5d show intermediate positions of the pivot angle between maximum deflection downwards (FIG. 5a) and maximum deflection upwards (FIG. 5e).

In FIG. 5a, the propeller blade has been pivoted downwards to a maximum extent. The angle of attack is of maximum magnitude, because the connecting unit 150 pushes the leading edge of the propeller blade upwards, or holds said leading edge up, if the propeller blade pivots downwards. As a result, the trailing edge 214, 224 of the propeller blade lies lower than the leading edge 114, 124, which leads to the large angle of attack. The angle of attack results from a rotation of the propeller blade about the axis of the propeller blade, wherein said rotation is caused by the static connecting member in combination with the pivoting movement. FIGS. 5b-5e show a decrease of the angle of attack (indicated by a connecting line 510 assuming a shallow angle) of the propeller blade when the propeller blade pivots from the lower position (pivoted downwards to a maximum extent) upwards. The angle of attack is, as described above, varied or passively predefined by the connecting unit in a manner dependent on the pivoting movement, because the connecting unit is coupled to the leading edge of the propeller blades and holds the leading edge, at least in the vicinity of the coupling point to the connecting unit, at approximately the same level even if the propeller blade pivots. The connecting unit is thus not influenced by an actuator and is also not controlled by a control unit, but rather is a purely passive element.

The in each case two horizontal dash-dotted lines 500, 505 in FIGS. 5a to 5e are to be understood as reference lines or auxiliary lines and can schematically indicate the position of the leading edge and of the trailing edge of the front propeller blade, wherein the upper line 505 can be assigned to the leading edge and the lower line 500 can be assigned to the trailing edge. The further downwards a propeller blade pivots (front propeller blade in FIGS. 5a and 5b), the greater the angle of attack becomes, because the pivoting movement pivots the propeller blade downwards, but holds the leading edge, at least in the vicinity of the coupling point to the connecting unit, at approximately the same level. Conversely, in the case of an upwards pivoting movement (FIGS. 5d and 5e), the angle of attack of the propeller blade becomes shallower, because the connecting unit holds the leading edge of the propeller blade down. The upwards pivoting movement has the effect that the trailing edge is raised relative to the leading edge, and the spacing between the two horizontal dash-dotted lines 500, 505 becomes smaller. By means of the angle of attack that becomes shallower, the lift on said upwardly pivoted propeller blade is reduced.

In FIG. 5a, the difference between the lift forces on the front and rear propeller blades is very large; specifically, the lift force on the rear propeller blade, which has been pivoted upwards to a maximum extent, is considerably greater than that on the front propeller blade. The large angle of attack at the front propeller blade is furthermore present in order to compensate this nonequilibrium between the lift forces on the propeller blades. At the same time, the angle of attack of the rear propeller blade is reduced, because this has been pivoted upwards to a maximum extent. The nonequilibrium is thus compensated by adaptation of the angle of attack at the two propeller blades. The same applies to FIG. 5e, but with reversed signs, because the front propeller blade has been deflected upwards to a maximum extent. FIG. 5c shows a situation in which the lift forces on the propeller blades are in equilibrium. Although the propeller blades each have an angle of attack greater than 0°, they are however situated at the same level, that is to say are not in equilibrium. The angle of attack of the propeller blades in FIG. 5c provides lift force required for hovering flight or for vertical flight.

By means of the propeller arrangement according to the invention, the aircraft exhibits improved vertical start capability and can reach faster cruising flight speeds. In particular, a transition from vertical flight or hovering flight into horizontal flight is also improved. This transition may also be referred to as transition phase. In one example, the lift propellers are electrically operated. The lift may be varied by means of the propeller arrangement according to the invention through variation of the rotational speed of the drive shaft or of the motor and through the adjustment of the setting angle or angle of attack of the first and second propeller blades.

The diameters of the propeller may range from 70 cm to 250 cm. The take-off weight of the aircraft may amount to between 100 kg and 1000 kg. In a further embodiment, the variation of the setting angle may also be assisted by means of propellers with positive rotation capability.

It is additionally pointed out that "comprising" does not rule out other elements or steps, and "a" or "an" does not rule out a multiplicity. It is also pointed out that features or steps that have been described with reference to one of the above exemplary embodiments may also be used in combination with other features or steps of other exemplary embodiments described above. Reference designations in the claims are not to be regarded as restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE DESIGNATIONS

1 Aircraft
3a, 3b Aerofoils
5 Lift rotors
6, 17 Nacelles
7 Propeller
9 Thrust drive
11 Thrust propeller
13 Fuselage
15 Wing structure
19 Rotor axle
21, 23 Control surfaces
25 Vertical tail
27 Support structure
30 Thrust force
100 Propeller arrangement
110 First propeller blade
112 First axis of rotation
114 First leading edge
120 Second propeller blade
122 First axis of rotation
124 Second leading edge
130 Propeller mount
132 Pivot axis
134 Bolt
140 Drive shaft
150 First connecting unit
152 Connecting member
154 Coupling ring
160 Holding unit
162 Plate
164 Holding arm
166 Bearing element, bolt
170 Second connecting member
210 Lift force
214 First trailing edge
220 Forward direction
224 Second trailing edge
230a Lift of second propeller blade
230b Lift of the first propeller blade
240a Direction of rotation of the second propeller blade
240b Direction of rotation of the first propeller blade
300 Pulling force
310 Rotational force
500, 505 Horizontal dash-dotted lines
510 Connecting line

The invention claimed is:

1. A propeller arrangement for an aircraft, comprising:
a first propeller blade and a second propeller blade;
a propeller mount on which both the first propeller blade and the second propeller blade are mounted;
a drive shaft with a holding unit; and
a first connecting unit;
wherein the first propeller blade is rotatable about a first axis of rotation and the second propeller blade is rotatable about a second axis of rotation;
wherein the propeller mount is pivotable about a pivot axis;
wherein the drive shaft is arranged so as to set the propeller mount in rotation;
wherein the holding unit couples the propeller mount to the drive shaft; and
wherein the first connecting unit is coupled to the first propeller blade and to the holding unit, such that, in the event of a pivoting of the propeller mount about the pivot axis, the first propeller blade is set in rotational motion about the first axis of rotation.

2. The propeller arrangement according to claim 1, wherein the first connecting unit is coupled to the first propeller blade such that the connecting unit subjects the first propeller blade to a rotational force about the first axis of rotation.

3. The propeller arrangement according to claim 1, wherein the first connecting unit is coupled to the first propeller blade at a first leading edge of the first propeller blade.

4. The propeller arrangement according to claim 1,
wherein the first connecting unit has a connecting member and a coupling ring coupled to the connecting member;
wherein the connecting member is coupled to the holding unit; and
wherein the coupling ring is coupled to the first propeller blade.

5. The propeller arrangement according to claim 4,
wherein the connecting member is coupled by a first articulated connection to the coupling ring;
wherein the connecting member is coupled by a second articulated connection to the holding unit.

6. The propeller arrangement according to claim 1, wherein the first connecting unit is configured to subject the first propeller blade to a pulling force in order to rotate the first propeller blade about the first axis of rotation.

7. The propeller arrangement according to claim 1, wherein the first connecting unit is configured to subject the first propeller blade to a pushing force in order to rotate the first propeller blade about the first axis of rotation.

8. The propeller arrangement according to claim 1, wherein the first connecting unit is manufactured from a metallic material.

9. The propeller arrangement according to claim 1, wherein the holding unit has two holding arms, wherein the holding arms are arranged so as to hold the propeller mount in an intermediate space between the holding arms and to permit a pivoting about the pivot axis.

10. The propeller arrangement according to claim 1, further comprising:
a second connecting unit;
wherein the second connecting unit is coupled to the second propeller blade and to the holding unit such that, in the event of a pivoting of the propeller mount about the pivot axis, the second propeller blade is set in rotational motion about the second axis of rotation.

11. The propeller arrangement according to claim 10, wherein the second connecting unit is coupled to the second propeller blade at a second leading edge of the second propeller blade.

12. The propeller arrangement according to claim 10, wherein the second connecting unit is coupled to the second propeller blade and the first connecting unit is coupled to the first propeller blade such that, during the pivoting of the propeller mount about the pivot axis, the first connecting unit subjects the first propeller unit to a pushing force, and at the same moment the second connecting unit subjects the second propeller blade to a pulling force.

13. An aircraft having at least one propeller arrangement according to claim 1.

14. The aircraft according to claim 13, wherein at least one propeller arrangement is arranged on the aircraft in order to provide a lift force.

15. The aircraft according to claim 13, further comprising a thrust drive and at least one aerofoil.

16. The propeller arrangement according to claim 1, wherein the holding unit comprises a plate, and
wherein the two holding arms project from the plate.

* * * * *